US006485598B2

(12) United States Patent
Brocard et al.

(10) Patent No.: US 6,485,598 B2
(45) Date of Patent: Nov. 26, 2002

(54) METHOD OF MANUFACTURING A ROD INSULATOR

(75) Inventors: Emmanuel Brocard, Clermont Ferrand (FR); Guy Thevenet, Beaumont les Randan (FR)

(73) Assignee: Sediver, Societe Europeene, Nanterre (FR)

( * ) Notice: Subject to any disclaimer, the term of this patent is extended or adjusted under 35 U.S.C. 154(b) by 0 days.

(21) Appl. No.: 09/916,776

(22) Filed: Jul. 27, 2001

(65) Prior Publication Data

US 2002/0020938 A1 Feb. 21, 2002

(30) Foreign Application Priority Data

Aug. 1, 2000 (FR) ........................................... 00 10142

(51) Int. Cl.$^{7}$ .......................... B29C 45/14; B29C 65/70

(52) U.S. Cl. ....................... 156/245; 264/250; 264/274; 264/275; 174/196; 174/189

(58) Field of Search .......................... 156/245; 264/250, 264/255, 271.1, 259, 274, 275; 174/169, 176, 178, 179, 194, 196, 189

(56) References Cited

U.S. PATENT DOCUMENTS 3,576,938 A * 5/1971 Capotosto ................... 174/196
3,797,104 A * 3/1974 Pote ............................ 29/593
4,373,113 A * 2/1983 Winkler et al. ............. 264/254
4,414,429 A * 11/1983 Kaczerginski et al. ...... 174/179
5,147,984 A 9/1992 Mazeika et al.
5,220,134 A * 6/1993 Novel et al. ................ 174/179
5,779,963 A * 7/1998 Chappaz et al. ............ 264/254
5,830,405 A * 11/1998 Mazeika et al. ............ 264/239
5,902,963 A * 5/1999 Chappaz et al. ............ 174/167
5,945,636 A * 8/1999 Sakich et al.

FOREIGN PATENT DOCUMENTS

| | | |
|---|---|---|
| DE | 3014600 | 10/1981 |
| FR | 2680041 | 2/1993 |

* cited by examiner

*Primary Examiner*—Angela Ortiz
(74) *Attorney, Agent, or Firm*—Ware, Fressola, Van Der Sluys & Adolphson LLP

(57) ABSTRACT

A method of manufacturing an electrical rod insulator for supporting an electrical conductor and comprising an insulating core obtained by molding and having a top end and a bottom end with a bore for receiving said rod in an axial direction, and covered in a molded covering having a groove for supporting said electrical conductor, wherein the core is molded in such a manner that its outside surface defines radial ribs extending along the axial direction from the top end of the core, said ribs being spaced apart from one another by a distance that is constant and substantially equal to the thickness of the core. The method makes it possible to avoid problems associated with molding large thicknesses when making a composite insulator having better mechanical and electrical properties at low cost.

6 Claims, 2 Drawing Sheets

METHOD OF MANUFACTURING A ROD INSULATOR

TECHNICAL FIELD

The invention relates to a method of manufacturing a rigid electrical pin insulator for supporting an electrical conductor, the insulator comprising an electrically insulating rigid core obtained by molding and having a top end, a bottom end with a bore for receiving said pin and extending in an axial direction between said top and bottom ends, and an outer surface covered in a dielectric covering obtained by molding and having a shaped outside surface defining at least one groove for supporting said electrical conductor and having fins that are annular about the axis of the bore.

BACKGROUND OF THE INVENTION

Such an insulator is generally designed to be installed on a high voltage or medium voltage electricity pylon, e.g. to support an electrical conductor such as an optionally insulated cable of an electricity transport line, while keeping the cable electrically insulated from the pylon.

Thus, such an insulator is generally subjected to high mechanical stresses due in particular to the weight of the cable it supports, while also providing a high degree of electrical insulation. Conventionally, such an insulator has been made of glass or porcelain, and recent developments in materials have led to this type of insulator being made, for example, out of composite material, thereby saving a considerable amount of weight compared with glass and also reducing manufacturing costs, but presenting difficulties associated with molding such composite materials.

One such composite material insulator is known from U.S. Pat. No. 5,945,636. In that known insulator, the core, which is covered in a thin skin for protecting the core from environmental attack, is itself solid and of varying thicknesses, thus making it difficult to mold without any internal defects.

In general, when a solid piece is obtained by molding, there is a danger of shrink cavities arising or indeed of residual stresses remaining due in particular to the material shrinking as it cools. Thus, when a solid part is to be molded, one of the difficulties lies in implementing a molding technique that is adapted to avoiding such irregularities.

For example, in order to mold a solid piece, it is possible to add vents and feeders for facilitating the flow of material in the mold and for ensuring that pressure is uniform in the cast piece so as to avoid giving rise to mechanical irregularities such as holes or shrink cavities. The drawback of such solutions is that they complicate the shape of the mold, they increase manufacturing cycle time, and they need to be developed empirically, which constitutes an overhead cost in manufacture.

OBJECT AND SUMMARY OF THE INVENTION

The object of the invention is to remedy those drawbacks.

To this end, the invention provides a method of manufacturing a rigid electrical pin insulator for supporting an electrical conductor, the insulator comprising an electrically insulating rigid core obtained by molding and having a top end, a bottom end with a bore for receiving said pin and extending in an axial direction between said top and bottom ends, and an outer surface covered in a dielectric covering obtained by molding and having a shaped outside surface defining at least one groove for supporting said electrical conductor and having fins that are annular about the axis of the bore, wherein said core is molded in such a manner that its outside surface defines radial ribs which extend in the axial direction from the top end of the core, said ribs being spaced apart from one another by a distance that is constant and substantially equal to the thickness of the core.

Such a method simplifies the manufacture of a pin insulator by molding a composite material by avoiding problems associated with molding parts of excessive thickness while not harming the mechanical and electrical properties of the insulator and not increasing the cost of manufacturing the insulator.

In a particular implementation of the method of the invention in which the core and said dielectric covering are molded out of the same material, the covering being overmolded onto said core, good cohesion is obtained between the core and the covering.

In another particular implementation of the method of the invention, in which the core and said dielectric covering are molded out of different materials, the covering being engaged on said core, it is possible to select the materials so as to best optimize manufacturing cost of the insulator as a function of the desired mechanical and electrical performance.

In yet another particular implementation of the method of the invention, in which the core is made of epoxy, and/or silicone, and/or thermoplastic materials, and/or polyester, and/or composite material, a low cost insulator is obtained.

In yet another particular implementation of the method of the invention in which the core is built up from a plurality of molded parts, each of which is of substantially constant thickness, it is possible to obtain a solid insulator of large dimensions.

BRIEF DESCRIPTION OF THE DRAWINGS

The method of the invention is described below in greater detail and with reference to the accompanying drawings which show an embodiment by way of non-limiting example.

BEST MODE FOR CARRYING OUT THE INVENTION

Figure 1:
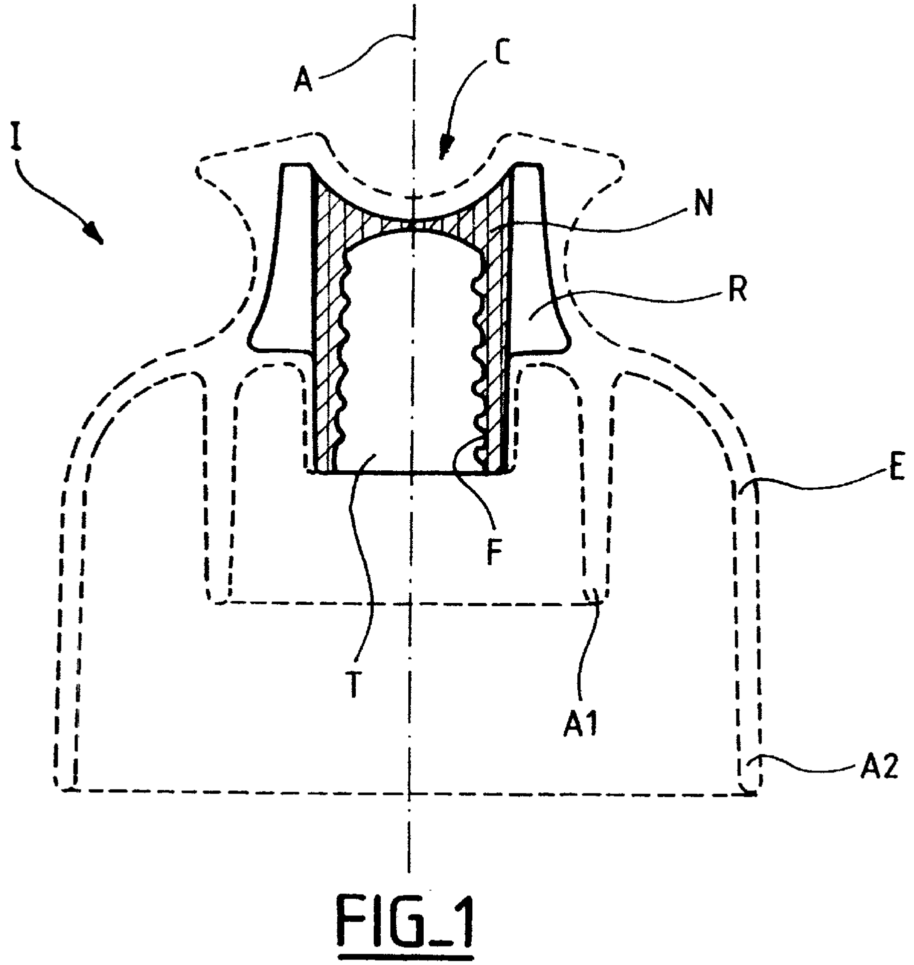
FIG. 1 is a section view showing the core of an insulator made using the method of the invention.

FIG. 1 shows an electrical pin insulator I made using the method of the invention and seen on a section plane that includes its longitudinal axis A. In this figure, it can be seen that the insulator is constituted mainly by two parts which are a covering E drawn in dashed lines and whose shaped outside surface defines annular fins A1 and A2 disposed coaxially about a large fraction of the axis A, together with a core N whose outside surface is covered in the covering E. At the top portion of the insulator and of the core N, the outside surface of the covering E also defines a groove C of semicylindrical shape which is designed to support an electrical cable extending along an axis that is normal to the plane of the figure. In the bottom portion of the insulator and of the core N, a bore T having a thread F is made inside the core N, coaxially about the main axis A and designed to receive the insulator-supporting pin which can be secured in the present case by screw fastening.

The body of the core N is represented by a shaded zone and the core comprises radial ribs R extending in planes that contain the longitudinal axis A and starting from the top end of the core.

In this figure, it can be seen that the insulator is of relatively large thickness, particularly when thickness is measured on an axis contained in the plane of the figure and perpendicular to the axis A, and passing through the core. Elsewhere, the thickness of the insulator is very small, e.g. the thickness of its annular fins. FIG. 1 also shows that the thickness of the covering E on its own, and indeed the thickness of the core N on its own, are both relatively small, and above all are relatively constant.

The method of the invention consists in making the core N with relatively constant thickness in a first molding operation, and then once the core N has cooled and stabilized, in casting the covering E so as to overmold it on the core N which is placed for this purpose in a different mold, so that this second molding operation serves to make the second part E with thickness that is relatively constant and equal to that of the core N. Thus, the method of the invention makes it possible to provide an insulator of thicknesses that are simultaneously large and very varied, but without being confronted by problems of excessive thickness during molding.

Figure 2:
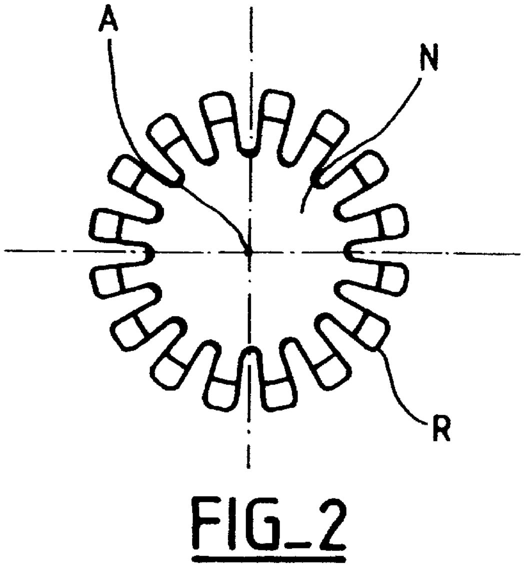
FIG. 2 is a plan view of the core of an insulator made using the method of the invention.

FIG. 2 is a plan view of the core N on its own, showing sixteen radial ribs R uniformly spaced apart from one another around the periphery of the core N. More particularly, each fin is disposed in a plane that is normal to the plane of the figure and that contains the axis A which in this figure is likewise normal to the plane of the figure. The distance between two consecutive ribs is constant and substantially equal to the thickness of the core and to the thickness of a rib.

Figure 3:
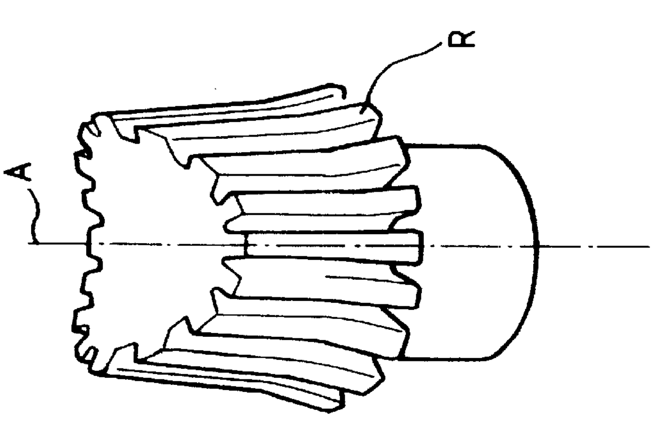
FIG. 3 is a perspective view of the core of an insulator made using the method of the invention.

FIG. 3 is a perspective view of the core with its radial ribs R uniformly distributed around the axis A. These radial ribs R also contribute to obtaining a mechanical interface between the core N and the covering E that is of good quality by increasing the area of contact.

Figure 4:
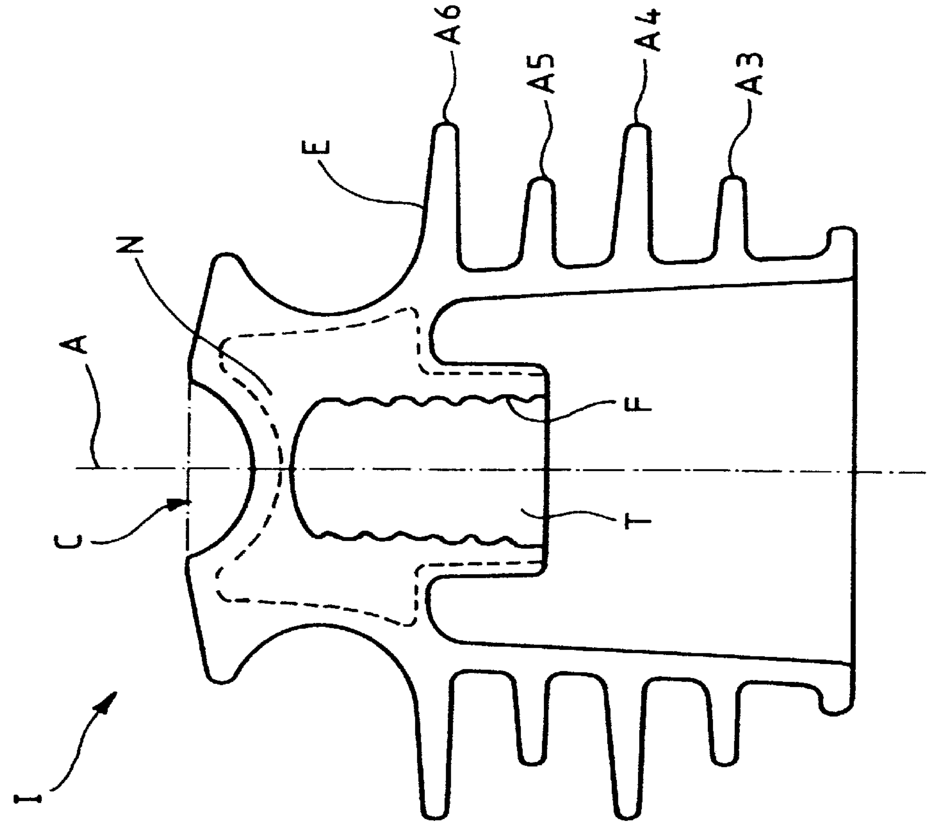
FIG. 4 is a section view of a second insulator made using the method of the invention.

FIG. 4 shows an insulator I made using the method of the invention and shown in a section plane that contains the longitudinal axis A. In this figure, it can be seen that this insulator still comprises a covering E now drawn in continuous lines, but having fins A3, A4, A5, and A6 that are annular about the axis A and that project essentially perpendicularly relative thereto, together with a core N shown in dashed lines which is embedded inside the covering E. In its top portion, this insulator has a groove C of semicylindrical shape for supporting an electric cable lying on an axis that is normal to the plane of the figure, and in its bottom portion it has a bore T with a thread F formed in the core N, coaxially about the main axis A, and designed to receive a pin which is secured by screw fastening.

The outer profile of this insulator differs from that of FIG. 1, but its core N is identical to that of FIG. 1.

The core and the covering of the insulator of the invention can be made by molding an epoxy resin, a silicone, a polyester, or any other thermoplastic and/or composite material. The core N and the covering E can be made out of the same material or they can be made out of different materials so as to make it possible to adapt mechanical and electrical performance and manufacturing costs of the insulator by appropriately selecting the most suitable materials available on the market.

If the same electrically insulating material is used to make both the core and the covering, then the covering can be molded directly over the core so that there is no interface between these two parts. If different materials are used for making the covering and the core, then the covering could be engaged on the core and fixed thereto by adhesive or by any other assembly method with or without prior treatment (corona treatment, cold plasma, . . . ) for improving the interface between the covering and the core.

To make an insulator of large dimensions and considerable thickness, it is possible to mold the core N in a plurality of steps so that each step consists in molding a part having thickness that is substantially constant, as mentioned above.

Finally, the covering, the core, or the parts making up the core can be molded using a molding method relying on injection, and/or compression, and/or transfer in order to further reduce the cost of manufacture or to make use of a molding technique that is specific to a particular type of material.

Naturally, the manufacturing method of the invention applies to an insulator covering e in the form of a skirt like that shown in FIG. 1 and also to a covering e having annular fins a3–a6 which extend completely radially relative to the axis a.

What is claimed is:

1. A method of manufacturing a rigid electrical pin insulator for supporting an electrical conductor, comprising the steps of:

molding a rigid core with an electrically insulating material, said core having a top end, having a bottom end with a bore for receiving said pin and extending in an axial direction between said top and bottom ends, and having an outer surface, and covering the outer surface of said core with a dielectric covering having a shaped outside surface defining at least one groove for supporting said electrical conductor and annular fins, wherein said molding step of said core is performed in such a manner to make the core with relatively constant material thickness by making radial ribs at the outer surface of said core which extend in the axial direction from the top end of the core.

2. The method of claim 1 in which said molding step is performed in such a manner to have the radial ribs with a constant thickness and spaced apart from one to another by a distance relatively equal to the material thickness of said core.

3. The method of claim 2 in which said dielectric covering is over-molded onto said core with the same electrically insulating material of the core.

4. The method of claim 3 in which the core and the dielectric covering are made of epoxy and/or silicone and/or thermoplastic materials and/or polyester and/or composite material.

5. The method of claim 1 in which the core and the dielectric covering are molded out of different materials, the covering being engaged on said core.

6. The method of claim 5 in which the covering is stuck onto said core.

* * * * *

UNITED STATES PATENT AND TRADEMARK OFFICE

CERTIFICATE OF CORRECTION

PATENT NO. : 6,485,598 B2
DATED : November 26, 2002
INVENTOR(S) : Brocard et al.

It is certified that error appears in the above-identified patent and that said Letters Patent is hereby corrected as shown below:

<u>Column 4,</u>
Lines 24 and 25, “e” should be -- E --.
Line 26, “a3-a6” should be -- A3-A6 --.
Line 27, “a” should be -- A --.

Signed and Sealed this

Eleventh Day of March, 2003

JAMES E. ROGAN
*Director of the United States Patent and Trademark Office*

UNITED STATES PATENT AND TRADEMARK OFFICE

CERTIFICATE OF CORRECTION

PATENT NO. : 6,485,598 B2
DATED : November 26, 2002
INVENTOR(S) : E. Brocard et al.

It is certified that error appears in the above-identified patent and that said Letters Patent is hereby corrected as shown below:

Title page,
Item [73], Assignee, "Sediver, Societe Europeene" should be -- Sediver, Societe Européenne D'Isolateurs en Verre et composite --

Signed and Sealed this

Seventeenth Day of February, 2004

JON W. DUDAS
*Acting Director of the United States Patent and Trademark Office*